Aug. 19, 1969 M. J. ELTGROTH 3,462,640
SPOT-BURN PROTECTION CIRCUIT
Filed Oct. 21, 1968
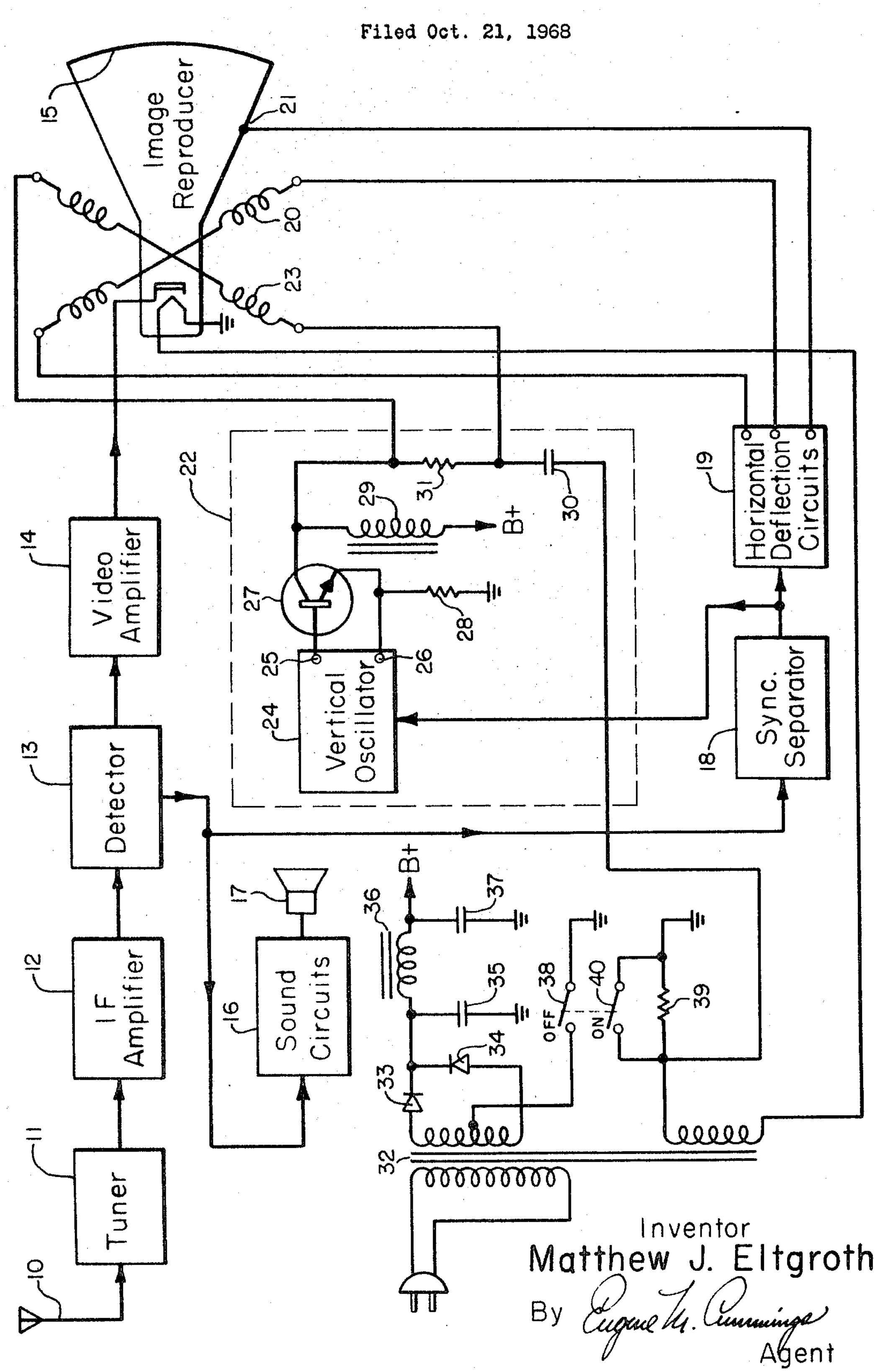
Inventor
Matthew J. Eltgroth
By Eugene M. Cummings
Agent 3,462,640
SPOT-BURN PROTECTION CIRCUIT Matthew J. Eltgroth, Chicago, Ill., assignor to Zenith Radio Corporation, Chicago, Ill., a corporation of Delaware Filed Oct. 21, 1968, Ser. No. 769,330
Int. Cl. H01j *29/70*
U.S. Cl. 315—20 9 Claims

ABSTRACT OF THE DISCLOSURE

A spot-burn protection circuit for preventing damage to the phosphor viewing screen of a television picture tube by the residual undeflected electron beam present in the tube after the receiver is turned off. The receiver is transistorized and achieves instant-on operation by supplying the heater of the picture tube during standby operation with a reduced filament current through a series dropping resistor, which is shorted out during normal operation. A portion of the AC voltage drop across this resistor is supplied to the receiver vertical deflection winding during standby operation to vertically oscillate the residual electron beam and thereby prevent it from falling on any one spot on the phosphor screen.

BACKGROUND OF THE INVENTION

This invention pertains to television receivers, and more particularly to a spot-burn protection circuit for a television receiver.

It has been known that the viewing screen of a cathode-ray tube can be permanently damaged by allowing the electron scanning beam of the tube to impinge on a concentrated area of the screen for any length of time. This is because the excess energy present in the concentrated area is dissipated as heat, which causes permanent chemical transformation, or burning, of the phosphor coating in the concentrated area. While such spot-burn can occur by failure of the receiver deflection circuits while filament and high voltage remain applied to the image reproducer, the more frequent situation is where following de-energization of the receiver the deflection circuits cease operation immediately, although the electron gun of the image reproducer continues to emit electrons for a considerable period of time.

In the past, manufacturers have gone to great lengths to eliminate such de-energization spot-burn by employing additional components such as capacitors for dissipating the stored energy in the image reproducer immediately following de-energization. Unfortunately, such circuits were expensive in that they required components and circuitry not otherwise required in the receiver. With the present high-volume low-profit margin consumer television receiver market, such an expense was especially unwelcome.

The problem of de-energization spot-burn became more prevalent with the introduction of instant-on transistorized television receivers. In these sets the deflection circuitry is transistorized, and therefore ceases to function almost immediately following de-energization of the receiver, while the image reproducer is of conventional thermionic vacuum tube design and therefore has a heater which continues to emit electrons for a considerable period of time following loss or deflection energy.

Accordingly, it is a general object of the invention to provide a new and improved and more economical spot-burn protection circuit.

It is a more specific object of the invention to provide a spot-burn protection circuit requiring a minimum number of additional components.

In accordance with the invention, a television receiver having active and standby operational modes, and including a spot-burn protection circuit for preventing damage to its viewing screen following transition from the active to the standby modes, includes a cathode-ray type image reproducer having a phosphor viewing screen, a deflection winding and an electron beam, the electron beam being present during the active mode and having a decay period extending into the standby mode which undesirably subjects the viewing screen to spot-burn damage in the absence of a deflection signal in the deflection winding. Means comprising a deflection amplifier are included for applying a deflection signal to the deflection winding during the active mode to sweep the electron beam in synchronism with a received transmission, the means being inoperative in the standby mode. Further included is an AC responsive power supply for the receiver, and means coupled to the power supply for applying an alternating current deflection signal to the deflection winding only during the standby mode to prevent the decaying electron beam from damaging the phosphor viewing screen.

BRIEF DESCRIPTION OF THE DRAWING

The features of the present invention which are believed to be novel are set forth with particularity in the appended claims. The invention, together with the further objects and advantages thereof, may best be understood by reference to the following description taken in conjunction with the accompanying drawing, which is a block diagram, partially in schematic form, of a television receiver incorporating a spot-burn protection circuit constructed in accordance with a preferred embodiment of the invention.

DESCRIPTION OF THE PREFERRED EMBODIMENT

With the exception of the spot-burn protection circuitry, the illustrated receiver is essentially conventional in design and accordingly only a brief description of its structure and operation need be given here. A received signal is intercepted by an antenna and coupled in a conventional manner to a tuner 11, which includes the usual radio frequency amplifying and heterodyning stages for translating the signal to an intermediate-frequency. After amplification in an intermediate-frequency amplifier 12, the signal is applied to a detector 13 wherein video, synchronizing and sound information in the form of a composite video-frequency signal is derived. The video information is amplified in a video amplifier 14 and applied to the cathode of a conventional cathode-ray tube type image reproducer 15. The sound component of the composite signal is applied to sound circuits 16, wherein conventional sound demodulation and amplification circuitry develop an audio output signal suitable for driving a speaker 17.

Synchronizing information, in the form of vertical and horizontal sync pulses, is separated from the composite video signal by a sync separator stage 18. The horizontal sync pulses are applied to horizontal deflection circuits 19, which stage includes conventional reaction-scanning circuitry for utilizing these pulses to generate synchronzied horizontal-rate sawtooth scanning current in a horizontal deflection winding 20 and conventional sweep-excited high voltage power supply circuitry for generating a DC accelerating potential for application to the ultor electrode 21 of image reproducer 15. The seperated vertical sync pulses are utilized by a vertical deflection stage 22 to generate a synchronized vertical-rate scanning signal in a vertical deflection winding 23. Included in deflection stage 22 is a vertical-rate oscillator 24 which operates in synchronism with the applied vertical sync pulses to generate a vertical-rate drive signal at output terminals 25 and 26, which signal is applied between the base and emitter electrodes of a vertical deflection amplifier, output transistor 27. The nature of this drive signal is such that transistor 27 is caused to generate the desired sawtooth signal in vertical deflection winding 33.

The emitter of transistor 27 is connected to ground by a bias-developing emitter resistor 28. The collector is connected directly to one side of vertical deflection coils 23, and receives operating power through a shunt-connected inductance 29 connected between that electrode and the receiver B+ supply. The other side of deflection coils 23 is returned to ground via a DC blocking capacitor 30 in a unique manner to provide spot-burn protection, as will be seen shortly. A damping resistor 31 is shunt-connected across the deflection coils to reduce transients and improve vertical linearity.

The receiver further includes a full-wave power supply which permits so-called "instant-on" operation of the receiver. In particular, the supply includes a provision for applying reduced filament voltage to the electron discharge devices in the receiver, while the receiver is in the standby mode, so that when the receiver is switched to the active mode and full filament voltage is applied, they will become operative more quickly. The power supply comprises a transformer 32 having a primary winding connected to the AC line and a center-tapped secondary winding having end terminals connected through a pair of diodes 33 and 34 to the input capacitor 35 of a conventional $\pi$-type filter network. The network comprises, in addition to capacitor 35, a filter choke 36 and an output capacitor 37. Filtered B+ is available at the junction of capacitor 37 and filter choke 36 at a polarity and current capacity suitable for powering the various transistorized circuits of the receiver. The center tap of the secondary winding is connected through one section 38 of a double-pole single-throw power switch, so that in the OFF position of this switch the connection is broken and no B+ is applied to the receiver.

Power transformer 32 further has a filament winding which provides a source of low-voltage 60 Hertz alternating current for the heater of image reproducer 15, the only electron discharge device in the receiver. One terminal of this winding is connected through the heater to ground, and the other terminal is connected through a voltage-dropping resistor 39 to ground. The second switch section 40 of the receiver power switch is shunt-connected across this winding to effectively short-out resistor 39 in the ON position.

When the power switch is in its OFF position, which corresponds to the receiver being in a standby mode, with transformer 32 energized but no B+ being applied to the receiver circuits, resistor 39 is in series with the heater of image reproducer 15, and causes a reduced alternating current to be applied to that element. However, when the power switch is in the ON position, corresponding to the receiver being in its active mode and B+ being applied to its various circuits, resistor 39 is shorted by switch section 40, which allows full current to be applied to the partially-heated heater of image reproducer 15. This causes that device to become operative almost immediately, and since the rest of the set is transistorized and requires no warm-up time, virtually instantaneous operation of the receiver results.

As mentioned previously, one problem associated with the operation of transistorized television receivers such as this one is that when the set is turned off, the deflection circuits, being transistorized, cease operation before the electron-beam of the electron-discharge thermionic cathode-ray tube has completely dissipated itself. As a result, the beam strikes the viewing screen without deflection, usually falling on the center in a single bright spot and eventually over-heating the phosphor and causing permanent damage to the screen. To overcome this problem, and in accordance with the invention, the receiver achieves spot-burn protection by returning DC blocking capacitor 30 to ground through resistor 39. Now, when the power switch is in the OFF position, and switch section 40 is open, the AC current developed across resistor 39 flows through DC blocking capacitor 30, vertical deflection winding 23 and transistor 27 to ground, and in so doing causes vertical deflection of any residual electron beam in image reproducer 15. This deflection, which may exceed one inch, prevents spot-burn after de-energization of the receiver by preventing the decaying electron beam from landing on one particular spot on the viewing screen. When the power switch is in the ON position, however, switch section 40 is closed, resistor 39 is shorted, and capacitor 30 is effectively connected directly to ground so that no 60 Hertz current follows through deflection winding 23 other than the sawtooth vertical deflection signal generated in stage 22.

Thus, the invention provides an extremely economical spot-burn protection circuit suitable for use in instant-on television receivers. In fact, in receivers having a shunt-fed vertical output stage similar to that illustrated here, all that is necessary to practice the invention is to return the normally grounded side of the deflection winding DC blocking capacitor to the heater winding instead of to ground, which in practice may amount to no more than the addition of a single length of wire.

The following are a set of component values for the illustrated circuit which has been found to provide satisfactory operation in accordance with the invention. It will be appreciated that these values are given by way of example, and that other values may be substituted therefore without departing from the true principles of the present invention.

| | |
|---|---|
| TR27 | Delco DTS–413. |
| TR33, 34 | 1N3750. |
| R28 | 12 ohms, 1 watt. |
| R31 | 47,000 ohms, ½ watt. |
| R39 | 5.6 ohms, 5 watts. |
| C30 | 40 microfarads. |
| C35, 37 | 750 microfarads, 100 v. DC. |
| L23: | |
| Vertical winding | 565 millihenries, 275 ohms. |
| Horizontal winding | 650 millihenries, 1 ohm. |
| L29: | |
| Henries | 4.5, at 0 milliamperes. |
| Henries | 3.5, at 100 milliamperes. |
| Henries | 2.4, at 200 milliamperes. |
| Ohms | 200. |
| L36 | 360 millihenries at 700 milliamperes. |
| T32: | |
| Primary | 120 v. AC 60 Hertz. |
| Secondary | 128 v. AC 680 milliamperes. |
| Secondary | 6.4 v. AC 450 milliamperes. |

While a particular embodiment of the invention has been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

I claim:

1. In a television receiver having active and standby operational modes and including a spot-burn protection circuit for preventing damage to its viewing screen following transitions from said active to said standby modes:

a cathode-ray type image reproducer having a phosphor viewing screen, a deflection winding and an electron beam, said electron beam being present during said active mode and having a decay period extending into said standby mode which undesirably subjects said viewing screen to spot-burn damage in the absence of a deflection signal in said deflection winding;

means comprising a deflection amplifier for applying a deflection signal to said deflection winding during said active mode to sweep said electron beam in synchronism with a received transmission, said means being inoperative in said standby mode;

an A-C responsive power supply for said receiver; and means coupled to said power supply for applying an alternating-current deflection signal to said deflection winding only during said standby mode to prevent said decaying electron beam from damaging said phosphor viewing screen.

2. A television receiver as described in claim 1 wherein said receiver comprises a thermionic electron-discharge device having a heater operable from a source of alternating current;

wherein said power supply includes a source of alternating current for applying operating power to said heater; and wherein said alternating current deflection signal applied to said deflection coil during said standby mode is derived from said heater current source.

3. A television receiver as described in claim 2, wherein said deflection winding is a vertical deflection winding, said deflection amplifier is a vertical deflection amplifier and said electron-discharge device is said image reproducer.

4. A television receiver as described in claim 1, wherein one terminal of said deflection winding is coupled to said deflection amplifier and the other terminal is returned to ground in said active mode and to said power supply in said standby mode.

5. A television receiver as described in claim 4, wherein a DC blocking capacitor is serially connected with said deflection winding.

6. A television receiver as described in claim 2, wherein said heater current source is a transformer winding and wherein partial operating power is applied to said heater during said standby mode by means including a dropping resistor serially connected between said transformer winding and said heater to shorten its warm-up time upon actuation to said active mode.

7. A television receiver as described in claim 6, wherein:

one terminal of said heater is connected to ground and the other terminal is connected to one terminal of said transformer winding, and the other terminal of said winding is connected to ground through said series dropping resistor;

wherein means including a switch shunt-connected across said series dropping resistor are provided to short out said resistor to apply full operating power to said heater in said active mode; and wherein said other terminal of said deflection winding is coupled to the juncture of said series dropping resistor and said transformer winding to apply alternating current to said deflection winding during said standby mode.

8. A television receiver as described in claim 7, wherein a DC blocking capacitor is serially connected with said deflection winding.

9. A television receiver as described in claim 7, wherein said deflection winding is a vertical deflection winding, said deflection amplifier is a vertical deflection amplifier and said electron-discharge device is said image reproducer.

References Cited

UNITED STATES PATENTS 2,514,079 7/1950 Lockhart ------------ 315—20

RODNEY D. BENNETT, Jr., Primary Examiner

JOSEPH G. BAXTER, Assistant Examiner

U.S. Cl. X.R.

315—26